United States Patent Office 3,052,663
Patented Sept. 4, 1962

3,052,663
PROCESS FOR PURIFICATION OF POLYVINYL CHLORIDE
Wolfgang B. A. Bodlaender, Rotterdam, and Hindrik Dijkhuizen, Hoogvliet, Netherlands, assignors to Shell Oil Company, a corporation of Delaware
No Drawing. Filed May 29, 1959, Ser. No. 816,720
Claims priority, application Netherlands May 30, 1958
9 Claims. (Cl. 260—92.8)

The present invention relates to an improved process for purifying polyvinyl chloride. More particularly, it relates to improvements in removing residual monomer from latices of polyvinyl chloride.

One of the preferred methods for the present commercial preparation of polyvinyl chloride consists in carrying out the polymerization of vinyl chloride in an aqueous emulsion. The latex obtained from the polymerization reactor generally has a polyvinyl chloride content in the range of 15 to 30% by weight. It also contains about 4-5% of residual vinyl chloride. At the present time, this monomer is usually removed by releasing the pressure on the latex and by steam distillation. While these methods are effective in removing a sufficient amount of monomer, certain problems have come up which are detrimental both to the process and other resulting products.

One of the difficulties arising in this monomer removal is the foaming of the latex, as a result of which latex may be entrained and PVC losses occur. Another drawback of this method of removing monomer is that uncontrolled after-polymerization occurs which has a harmful effect on the properties of the final product.

It is a primary object of this invention to provide a process for purifying polyvinyl chloride which avoids the above-mentioned difficulties. Another object of this invention is to provide a process for purifying polyvinyl chloride which provides an improved polymer product.

It has now been found that these and other objects are accomplished by a process for purifying polyvinyl chloride, comprising adding sufficient water to a polyvinyl chloride latex to provide a concentration of from about 8 to 12% polyvinyl chloride and adding a hydrocarbon material containing above 70% aliphatic constituents in an amount such that the ratio of hydrocarbon material to water is greater than 0.5.

As used herein, the term polyvinyl chloride is meant to include the high molecular weight polymer of vinyl chloride and high molecular weight copolymers in which at least 80% of the copolymer are vinyl chloride units. In other words, it is permissible to substitute up to 20% of the vinyl chloride and other vinyl compounds and still be within the ambit of the present invention.

The latex obtained from the polymerization reactor generally contains an emulsifier and a polyvinyl chloride content of say about 20%, which emulsion is rather viscous and somewhat difficult to transport. In the present process, it is found desirable to have sufficient water in the emulsion during the extraction so that the aqueous phase contains approximately 8-12% polyvinyl chloride. Thus, in the preferred process the water is added to the initial product from the polymerization reactor and thereby facilitates transportation of the liquid by lowering its viscosity. However, it is permissible to add the water of dilution at any time up to or simultaneously with the addition of the hydrocarbon.

In its broad aspect, the extraction requires a ratio of hydrocarbon to water which is at least 0.5 to 1. The optimum ranges depend upon whether the extraction of residual monomer is conducted on uncoagulated latex, or whether the extraction is conducted simultaneously with coagulation of the latex with an electrolyte as will be more fully explained hereinafter.

Where the extraction is to take place without coagulation, the preferred ratio of hydrocarbon to water is in the range from about 2:1 to about 8:1. With this ratio range, it was found possible to effect a separation into two layers, one containing hydrocarbon and the other containing dilute latex, without difficulty. The hydrocarbon which is used for the extraction must be present in a sufficient quantity to effectively take out residual monomer and also effect a separation from the water or latex layer. It is also necessary that the hydrocarbon be of such a nature that it does not cause solution of the polymer polyvinyl chloride. Thus aromatic materials are detrimental and should be avoided. However, a small amount of aromatic materials do not prevent the operation of the present process from being effective. In general, the hydrocarbon should be at least 70% aliphatic hydrocarbon and preferably more than 90% aliphatic hydrocarbon, which under extraction conditions are substantially immiscible with water, for example miscible to less than 5%. It is also desirable to utilize a hydrocarbon which is substantially free from unsaturation bonds which could cause uncontrolled after-polymerization and have a harmful effect on the final product. The preferred hydrocarbons are straight-run gasolines which boil in the range of 50–200° C. and preferably in the range of from 75–100° C.

The extraction may be carried out in any suitable manner, for example, by stirring latex, hydrocarbon and water together in a stirred vessel in the desired ratio. After phase separation the organic layer is run off and these operations of mixing the extracting agent with the aqueous phase, followed by phase separation, are preferably repeated one or more times. In other words, the aqueous raffinate phase is extracted one or more times. Alternatively, the extractive agent and the latex may be made to flow in countercurrent in relation to an extraction column.

The extraction temperature utilized is rather important in order to provide good phase separation. Thus, the most efficient operation requires carrying out the extraction at a temperature in the range of from 60–90° C. Pressure is not critical, but it may be desirable to carry out the extraction under pressure in order to keep the extraction agent in a liquid state. After extraction, the aqueous latex contains polyvinyl chloride freed from monomer, and can be worked up further in any of the known methods. For example, the monomer-free latex may be coagulated with an electrolyte or spray dried in order to remove the polyvinyl chloride from the aqueous emulsion.

Thus in its broad aspect, the present invention provides a simple and practical way of freeing polyvinyl chloride latex from residual monomer. However, in the preferred operation of the present invention process, it has been found that by combining other process steps with the hydrocarbon extraction mentioned above, a polyvinyl chloride having improved properties may be obtained.

Thus, in the preferred form of the present invention there is provided a process for purifying polyvinyl chloride, comprising adding sufficient water to a polyvinyl chloride latex to provide a concentration of from about 8 to about 12% polyvinyl chloride, adding a hydrocarbon material containing more than 70% aliphatic constituents in an amount such that the ratio of hydrocarbon material to water is greater than 0.5, and adding an electrolyte to the mixture of hydrocarbon material and latex in an amount sufficient to coagulate the latex. Surprisingly it has been found that certain properties and particularly the thermostability of the polyvinyl chloride is considerably improved by this combined extraction and coagulation. In addition much less extractive agent is required in the preferred range. Thus a ratio of hydrocarbon to water in the range of from 0.5:1 to 2:1, preferably of about 1:1 is sufficient.

Examples of electrolytes suitable for coagulation are calcium formiate, NaCl, sulfuric acid, hydrochloric acid, phosphoric acid, acetic acid and formic acid. Hydrochloric and nitric acid are preferably used. The acid is used in such a quantity that the pH of the aqueous phase after coagulation is in the range of from about 2 to about 4. The use of dilute acids is particularly important for latices in which fatty acid soaps are used as the emulsifier.

The latex is coagulated in the aqueous phase, but after coagulation both the polyvinyl chloride coagulant and the monomer are taken up at the hydrocarbon phase rather than having the polyvinyl chloride remain in the aqueous phase as it does without coagulation. It has also been found that the stirring speed during the extraction coagulation step is important to provide constant phase separation, because excessive agitation causes dispersion of the water in the hydrocarbon. Thus stirring should be carried out at a slow or moderate speed, for example, less than 250 r.p.m. However, some agitation is desirable in order to quickly achieve the solution of residual monomer in the hydrocarbon, to provide a good coagulant, and to assist in the complete transfer of the coagulant to the hydrocarbon phase. After the coagulant is taken up by the hydrocarbon phase and the aqueous and hydrocarbon phases settle out from each other, the phases are separated and the polyvinyl chloride coagulant is separated from the hydrocarbon by conventional methods such as settling, decanting, filtering or centrifuging. The monomer remains in the hydrocarbon phase and is removed with it. Preferably, the separated coagulant is washed in order to remove any further impurities and dried.

In accordance with a further feature of the present invention, the coagulated polyvinyl chloride is washed with gasoline and then subjected to a steam treatment. The steam treatment or stripping should increase the temperature of the polyvinyl chloride to at least 75° C. for say about 15 minutes, and preferably to a temperature of about 90° C. for say about 5 minutes. Good results are obtained when the steam treatment is combined with centrifuging of the polyvinyl chloride in order to remove the wash solvents used. Quite unexpectedly, this steam treatment provides an increase in the bulk density in an amount of about double or more of that obtained with untreated polyvinyl chloride. In addition, the coagulants are harder and drier than those obtained by conventional processes.

In order to better illustrate the invention, the following examples are given. The latex used in these examples was prepared by emulsion polymerization of vinyl chloride with potassium laurate as emulsifier and $H_2O_2$ as initiator. The latex obtained from the reactor substantially consisted of 20% PVC, 4% vinyl chloride and 0.7% emulsifier.

EXAMPLE I

Latex was run off into a mixture of gasoline (boiling range 80–95°) and water at room temperature while stirring, the ratio by volume of latex:gasoline:water being 1:10:1. The whole was shaken for 3 minutes. With this ratio it was found possible to effect a separation into two layers (gasoline and dilute latex). The latex layer was shaken with gasoline two additional times (ratio by volume 1:5). The ratio of bottom layer (latex) to top layer (gasoline) was 1:3 after the first extraction, 1:5 after the second extraction, and 1:7 after the third extraction. The whole was then coagulated with $HNO_3$ at 70° C. (pH=3), after which the coagulate was washed with alcohol and water. In this way substantially all of the residual monomer was removed.

EXAMPLE II

Latex from the reactor and a mixture of gasoline (boiling range 80–95°) and dilute nitric acid were continually led at 78–80° C. with slow stirring (100 r.p.m.) into a vessel. The ratio by volume of latex:gasoline:dilute nitric acid was 1:2:1. The PVC was coagulated and taken up in the gasoline phase, after which the whole was led into a separator; the pH of the separated aqueous phase was approximately 3.

The gasoline phase containing PVC was separated, the PVC filtered off and washed a number of times was gasoline and dried. The thermostability of the PVC was then determined by mixing 100 parts thereof for 5 minutes on a mill at 165° C. with 50 parts of dioctyl phthalate, 2 parts of white lead and 1 part of lead stearate. From the hide 1½ mm. thick, test specimens were pressed at 160° C. and 3000 kg./sq. cm. pressure for 1 minute, after which they were cooled off in 3 minutes at this pressure to 40° C. The reflection of the resultant test specimens was determined in a photo electric reflector by comparison with a standard plate showing a reflection of 100. The higher the reflection the better was the thermostability of the test specimen.

For the purpose of comparison test specimens were made of PVC obtained by the conventional stripping of vinyl chloride from the latex followed by coagulation with nitric acid, neutralization of the resultant fatty acid with caustic alkali solution, and washing out the soap. The polyvinyl chloride of Example II had a reflection of 81, whereas the polyvinyl chloride prepared by the conventional method had a reflection of 76.

It was found that the fatty acid content of the resultant PVC could be reduced to the very attractive value of 0.1%. The fatty acid content of the PVC worked up according to the conventional method can generally not be reduced to beyond 0.3%. Hence, the invention not only renders the alkaline washing superfluous, but also effects a considerable reduction in the fatty acid content.

EXAMPLE III

The effect of the stirring speed and temperature is shown by Table I which shows the results of comparative tests according to Example II in a three-liter beaker having an anchor stirrer with a diameter of 10 cm.

*Table I*

| Stirring speed | Quantity of water separated at an extraction/coagulation temperature of— | | | |
| --- | --- | --- | --- | --- |
| | 25° C. | 40° C. | 60° C. | 75° C. |
| | Percent | Percent | Percent | Percent |
| very slow (50–75 r.p.m.) | 85 | 85 | 96 | 97 |
| slow (125–150 r.p.m.) | 69 | 88 | 95 | 97 |
| rapid (250–350 r.p.m.) | 0 | 10 | 73 | 95 |

It was noticed that there was a better phase separation at a pH of 2 than at one of 4. In practice a pH of 3 in the aqueous phase after coagulation was found very satisfactory.

EXAMPLE IV

In order to determine the effect of the temperature on filtration time, a number of comparative tests were carried out using the procedure of Example II modified as hereinafter given. The coagulation temperature was also varied and the filtration time measured. The filtration time is the period in which 500 cc. of filtrate is obtained from 1000 cc. of a gasoline phase containing 10% coagulated polyvinyl chloride through a Buchner funnel of 12.5 cm. diameter while using a vacuum of 16 mm. Hg. In procedure A of Table II below, the polyvinyl chloride was coagulated at the given temperature, stirred for 15 minutes and then filtered at 20° C. In procedure B of Table II the polyvinyl chloride was coagulated at the given temperature, then stirred for 15 minutes while heating to 75° C., and filtered at 60° C. The results are given in Table II below.

Table II

| Coagulation Temperature | 25° C. | 43° C. | 60° C. | 70° C. |
|---|---|---|---|---|
| | Min. | Min. | Min. | Min. |
| Filtration time procedure A | 24 | 7 | 1.2 | 0.5 |
| Filtration time procedure B | 4 | 3.2 | 2.2 | 0.6 |

The above data shows that better filtration time is obtained with coagulation temperatures above 50° C. In addition, higher coagulation temperature improves the use of ambient filtration temperatures.

EXAMPLE V

Various coagulates obtained by coagulation of reactor latex in gasoline and dilute nitric acid according to the invention were treated with steam to 90° C. in (a) a centrifuge, and (b) a Buchner funnel with a steam-heated jacket. The effect of the bulk density and the percentage of volatile materials are shown in Table III.

Table III

| | Duration of heating | Bulk density, percent | Volatile |
|---|---|---|---|
| In centrifuge: | | | |
| Untreated | | 0.20 | 46 |
| Treated | 5 | 0.44 | 8 |
| Treated | 15 | 0.47 | 4 |
| In Buchner funnel: | | | |
| Untreated | | 0.31 | 45 |
| Treated | 5 | 0.49 | 24 |
| Treated | 10 | 0.50 | 23 |

The coagulates treated with steam in the centrifuge are drier and harder than the coagulates treated in another manner.

We claim as our invention:

1. In a process for purifying latices of polyvinyl chloride containing unreacted monomer remaining from the polymerization step, the step of contacting the latex with a liquid hydrocarbon material which is miscible with water to an extent of less than 5% under the extraction conditions, boils between 50° and 200° C., contains more than 70% aliphatic constituent and is substantially free of unsaturated bonds, the ratio of hydrocarbon to water in said contacting step being greater than 0.5:1, settling the contacted mixture, and separating an aqueous latex layer and a hydrocarbon layer from said contacting step.

2. In a process for purifying latices of polyvinyl chloride containing unreacted monomer remaining from the polymerization step, the steps of adding to the latex sufficient water to reduce the concentration of polyvinyl chloride therein to from about 8 to about 12%, contacting the resulting latex at a temperature in the range from about 60 to about 90° C. with a liquid hydrocarbon material which is miscible with water to an extent of less than 5% under the extraction conditions, boils between 50° and 200° C., contains more than 70% aliphatic constituents and is substantially free of unsaturated bonds, the ratio of hydrocarbon to water in said contacting step being from about 2:1 to about 8:1, settling the contacted mixture, and separating an aqueous latex layer and a hydrocarbon layer from said contacting step.

3. A process of recovering purified coagulated polyvinyl chloride from a latex thereof containing unreacted monomer remaining from the polymerization step, comprising adding to the latex sufficient water to reduce the concentration of polyvinyl chloride therein to from about 8 to about 12%, adding to the resulting latex a liquid hydrocarbon material which is miscible with water to an extent of less than 5% under the extraction conditions, boils between 50° and 200° C., contains more than 70% aliphatic constituents and is substantially free of unsaturated bonds, in an amount such that the ratio of hydrocarbon material to water is greater than 0.5:1, permitting the hydrocarbon and aqueous phases to separate, adding an electrolyte in an amount sufficient to coagulate the polyvinyl chloride content of the latex and recovering coagulated polyvinyl chloride of reduced monomer content.

4. A process of recovering purified coagulated polyvinyl chloride from a latex thereof containing unreacted monomer remaining from the polymerization step, comprising adding to the latex sufficient water to reduce the concentration of polyvinyl chloride therein to from about 8 to about 12%, adding to the resulting latex a liquid hydrocarbon material which is miscible with water to an extent of less than 5% under the extraction conditions, boils between 50° and 200° C., contains more than 70% aliphatic constituents and is substantially free of unsaturated bonds, in an amount such that the ratio of hydrocarbon material to water is greater than 0.5:1, permitting the hydrocarbon and aqueous phases to separate, adding an electrolyte in an amount sufficient to coagulate the polyvinyl chloride content of the latex and recovering coagulated polyvinyl chloride and subjecting the resultant polyvinyl chloride to a steam stripping treatment.

5. The process defined in claim 1, in which the ratio of hydrocarbon material to water is from about 3:1 to 8:1 during extraction, and the concentration of polyvinyl chloride in the water is from about 8 to about 12%.

6. The process defined in claim 1, in which the latex is extracted with the hydrocarbon a plurality of times.

7. The process defined in claim 1, in which the extraction is carried out at a temperature in the range of from about 60 to about 90° C.

8. The process defined in claim 3, in which a dilute acid is used as the electrolyte, and the quantity of acid is such that the aqueous phase has a pH range from about 2 to about 4 after coagulation.

9. The process defined in claim 3, in which the ratio of hydrocarbon material to water is from about 0.5:1 to about 2:1.

References Cited in the file of this patent
UNITED STATES PATENTS

| 2,080,589 | Wick | May 18, 1937 |
| 2,673,193 | Kolvoort | May 23, 1954 |